April 16, 1957 W. E. FOLKERTS 2,788,770
POWER STEERING MECHANISM
Filed March 2, 1954 2 Sheets-Sheet 1

INVENTOR.
Walter E. Folkerts.
BY
Harness and Harris
ATTORNEYS.

FIG. 4

INVENTOR.
Walter E. Folkerts
BY
ATTORNEYS.

United States Patent Office 2,788,770
Patented Apr. 16, 1957

2,788,770

POWER STEERING MECHANISM

Walter E. Folkerts, Hazel Park, Mich., assignor to Chrysler Corporation, Highland Park, Mich., a corporation of Delaware Application March 2, 1954, Serial No. 413,529

22 Claims. (Cl. 121—41)

This invention relates to power boosting mechanisms and more particularly to a power steering mechanism for use in automotive vehicles.

Conventional automotive vehicles are provided with a forward road wheel suspension which will permit a steering motion of the front wheels in tandem. To provide for such a steering motion a manually actuated steering wheel and steering shaft are mounted within the vehicle passenger compartment and they are drivably connected to the steering road wheels through a suitable steering mechanism which usually includes a speed reduction gear means.

Recent improvements upon such manual steering mechanisms for road vehicles include a means for providing a power boost to supplement the manual steering effort being applied to the vehicle steering wheel thereby assisting in the directional control of the vehicle during turning maneuvers and during "straight ahead" driving. Such power boosting mechanisms may comprise a fluid motor which is provided with a fluid pressure actuated member operatively connected to the steering mechanism. Fluid pressure may be supplied from an external source, such as an engine driven pump or a pressure accumulator for energizing the fluid motor, and the application of the pressure to the fluid motor working chambers may be controlled by means of a control valve which may be adapted to respond to variations in the manual steering effort. One such power boosting mechanism is disclosed in the copending application of Alan G. Loofbourrow, Serial No. 391,209 which is assigned to the assignee of the instant invention and reference may be had thereto for the purpose of supplementing the instant disclosure.

The power boosting mechanisms of the type above-described usually include a power cylinder, a movable piston member slidably disposed within the cylinder and a fluid pressure control valve for selectively applying fluid actuating pressure to alternate sides of the piston to motivate the same. The piston may be operatively connected to a driven portion of the steering mechanism and the control valve may include a movable control element which is adapted to be actuated in response to movement of the manually actuated driving member.

The control valves for such mechanisms often include a spool type valve element which is adapted for axial sliding movement and which has annular valve lands adapted to cooperate with mating valve recesses and valve elements in a relatively stationary sleeve within which the spool valve element is slidably disposed. The valve assembly is effective to selectively control the transmission of fluid pressure from an external pressure source to either of a pair of working chambers in the fluid motor of the mechanism.

The manufacture of the elements of a control valve assembly of the type briefly described above necessarily requires an extremely accurate machining operation and close manufacturing tolerances in order that the clearances between the valve lands on the movable valve element and the mating valve surfaces on the valve sleeve housing might be kept to the desired minimum value.

In order to prevent excess fluid leakage between mating valve portions it is necessary to provide a certain amount of overlap in the relative operating movement between the same. This overlap necessarily results in a slight delay in the response of the valve to the manual actuation of the driving member above referred to. That is, the movable valve element must be moved relative to the stationary mating valve elements a predetermined axial distance before a clearance is produced between two mating portions of the valve elements through which a controlled quantity of fluid may be passed. This problem immediately presents itself in hydraulic power steering mechanisms which make use of a closed circuit hydraulic system wherein the actuating fluid is applied under pressure to the fluid motor only during the actuation of the same. During periods when the operation of the fluid motor of such a closed system is not desired, the control valve is effective to block off the working chambers of the fluid motor from the fluid pressure source.

In power steering mechanisms which are generally referred to in the art as being of open circuit type, as distinguished from the above-described closed circuit type, the mating valve elements are adapted to permit a constant flow of hydraulic fluid therethrough from an external source to the working chamber of the fluid motor. The control valve also allows fluid to be exhausted from the working chambers at a rate equal to the rate at which fluid is supplied thereto. Upon relative movement between a movable valve element and a stationary valve element, the fluid circulating therethrough is selectively controlled so as to cause a fluid pressure buildup to occur within either of opposed pairs of working chambers in the fluid motor. Because of the manufacturing difficulties experienced in maintaining close tolerances on the control valve elements, the clearances between mating valve elements are normally undesirably large. Accordingly, a certain amount of relative movement between the mating valve elements is necessary before the above-mentioned pressure buildup occurs. A lagging has thus been experienced in power steering mechanisms of such an open circuit type similar to that which occurs in power steering mechanisms of the above-described closed circuit hydraulic system. This lagging, as previously explained, causes a delay in the response of the power boosting mechanism to the manual actuation of the driving member.

Accordingly, it is an object of the present invention to provide a power steering mechanism having a control valve for controlling the application of fluid pressure from an external source to the working chambers of the fluid motor which will permit an immediate response of the power steering mechanism to manual actuation of the driving member.

Another object of the present invention is to provide a control valve means for use with a power steering mechanism which is readily adapted for quantity production and which may be manufactured with relatively large machining tolerances.

A further object of the present invention is to provide a control valve of the type set forth above wherein butt-type valve elements are provided for progressively restricting the flow of fluid between cooperating portions of the valve elements, said cooperating portions being relatively movable into and out of abutting engagement to provide a variable size orifice therebetween for accommodating the flow of said fluid.

It is further contemplated that the power steering unit of the present invention should embody a means associated with the power boosting mechanism for providing a resistance to the manual effort applied to the manually operable steering shaft which is proportional to the magnitude of the resistance offered by the steering road wheels to directional variation during turning maneuvers of the vehicle. This is accomplished by providing a fluid pressure reaction means for applying a reaction force to the manually actuated portion of the steering unit including the steering shaft. The fluid pressure which is provided for this purpose may be the fluid pressure which is utilized to energize the fluid motor of the power boosting mechanism. The presence of such a reaction on the manually actuated portion of the unit provides the operator with a sense of "feel" of the road conditions thus enabling him to more easily maintain complete control over the vehicle. This pressure reaction may be more accurately described as a "steering sensation" which requires the operator to exert a manual effort proportional in magnitude to the steering requirements.

The broad concept of such a reaction means is commonly known in the art. However, the power boosting mechanism of the present invention is unique in this respect in that the hydraulic reaction is obtained within the fluid pressure control valve for the power boosting mechanism. Such a construction obviates the need for providing a separate hydraulic reaction mechanism for obtaining a road "feel" thereby simplifying the construction.

Accordingly, a further object of the present invention is to provide a valve mechanism, for use in combination with a fluid pressure actuated power boosting mechanism, which is adapted to be slidably actuated by a manually operated portion of the mechanism and which is provided with pressure reaction portions for resisting manual movement thereof, together with means for subjecting said pressure reaction portion to the working pressures of the hydraulic boosting mechanism.

The power boosting mechanism of the present invention is also unique for the reason that the same comprises a construction which embodies a fluid pressure control valve concentrically disposed within the piston in the fluid motor of the power boosting mechanism. The unit is for this reason preferably referred to as a concentric or coaxial power steering unit.

Accordingly, a further object of the present invention is to provide a power boosting mechanism of the concentric or coaxial type as briefly described above.

Further objects and advantages will become readily apparent from the following detailed description of the present invention wherein reference will be made to the accompanying drawings in which.

The presently described embodiment of the present invention incorporates a closed hydraulic pressure system of the type previously referred to. However, it is contemplated that the present invention might be embodied in other forms. Accordingly, the present disclosure is intended to be merely illustrative of one preferred form of the invention and is not intended to be limiting in nature.

Figures 1, 2, 3:
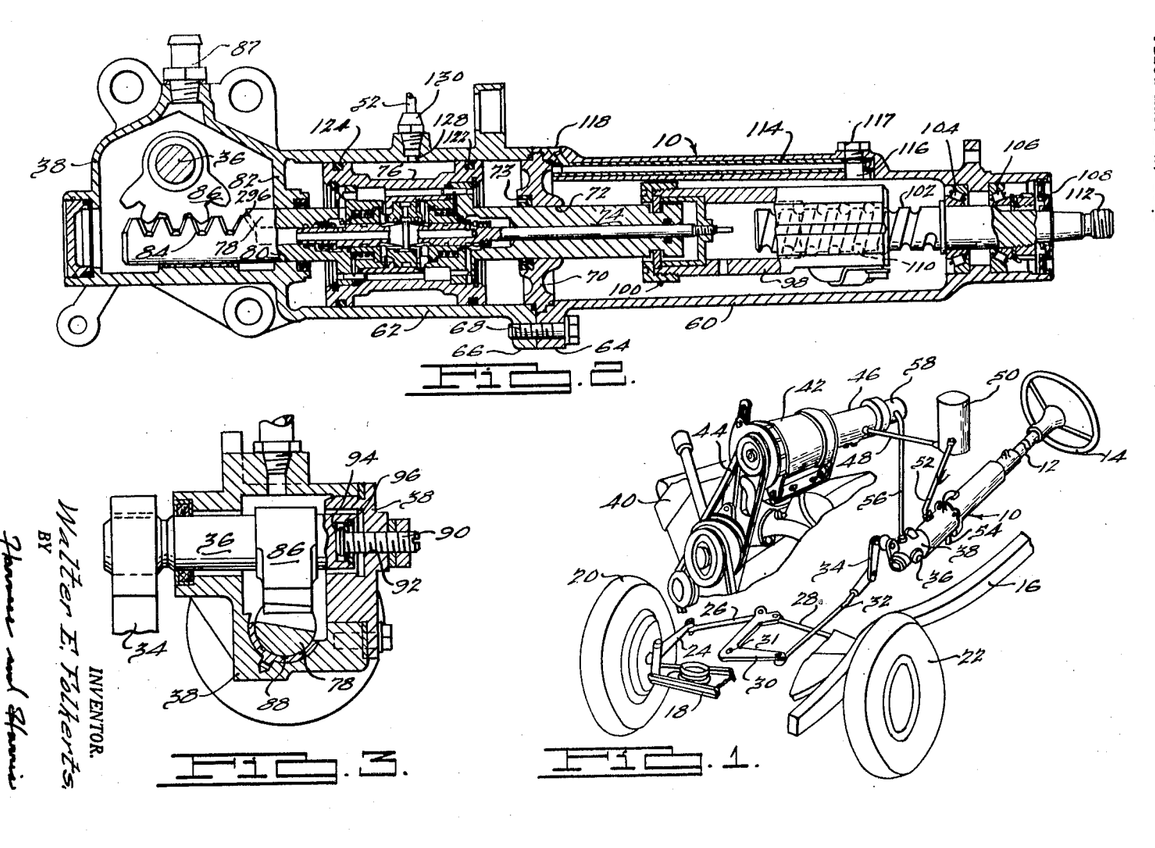
Figure 1 is an installation view of the present invention showing various associated component elements of an automotive vehicle in which it is adapted to be used.
Figure 2 is a longitudinal cross sectional view of the power steering unit of the present invention showing the manually actuated portion and the power boosting mechanism.
Figure 3 is a detail sectional view of the driven rack and pinion members associated with the power steering unit of the present invention showing the means for mounting the same.

Referring first to the installation view of Figure 1, the power steering unit is generally designated by numeral 10. A manually actuated steering shaft, shown at 12, extends axially from the unit 10 and is rotatably journalled therein. A suitable steering wheel 14 or the like may be operatively secured to the extended end of the shaft 12 for manually rotating the same.

The unit 10 may be secured to the vehicle frame, a portion of which is shown at 16, in any suitable manner. The frame 16 may be supported by a suitable suspension mechanism in any well known manner, a portion of such a suspension mechanism being illustrated at 18.

A pair of steering road wheels are shown at 20 and 22 which may be operatively joined to the vehicle suspension mechanism in any well known manner. The axle for each wheel 20 and 22 is integrally joined to one of a pair of steering arms associated with each wheel respectively, one of the steering arms being shown at 24. The steering arms are adapted to oscillate about a vertical axis closely adjacent to its connection with its associated road wheel. The free oscillating end of each steering arm is operatively connected by means of suitable links 26 and 28, respectively, to one arm of a bellcrank member 30 which is pivoted at 31 to a fixed portion of the vehicle frame 16. The other end of the bellcrank member 30 is operatively connected by means of a link member 32 to a free end of a depending pitman arm 34. Pitman arm 34 is journalled at one end to a rocker shaft 36 extending transversely through an end housing portion 38 of the power steering unit 10.

The vehicle installation of Figure 1 further comprises a power plant 40 which includes a usual electric generator 42 mounted thereon in a convenient position. The armature for the generator 42 may be powered by the power plant 40 by means of a crankshaft-driven-belt drive 44.

A fluid pressure pump 46 may be positioned, as shown, upon the power plant 40 and may be powered by virtue of a suitable positive connection which may be provided between the pump rotor and the generator armature shaft. A high pressure fluid conduit 48 may extend from the discharge portion of the pump 46 to the intake side of a fluid pressure accumulator 50. Pump 46 is thereby adapted to maintain a predetermined pressure within the accumulator 50. A high pressure conduit 52 extends from an output portion of the accumulator 50 to the power steering unit 10 to supply the same with fluid actuating pressure in a manner which will be hereinafter set forth in particular detail.

A drain passage 56 may be provided as shown for the purpose of conducting low pressure fluid from a portion of the power steering unit 10 to the intake portion of the pump 46. Another drain passage 54 may be connected as shown to another portion of the housing as shown to accommodate the discharge of excess fluid. The function of these drain passages 54 and 56 will be more completely understood from the following description. A suitable filter element 58, which may be secured in any convenient manner to the pump 46, is interposed in the low pressure fluid path provided by conduit 56.

Referring next to the longitudinal sectional view of Figure 2, the power steering unit 10 is shown in more particular detail and is seen to comprise a pair of axially disposed housing portions 60 and 62 which may be provided with a pair of opposed mating flanges 64 and 66, respectively. Suitable bolts 68 may be used for securing the flanges 64 and 66 together as shown.

A partition wall 70 extends transversely across the housing portion 60 and 62 in the vicinity of the respective mating flanges 64 and 66 and may be provided with a central circular aperture 72 through which a piston rod member 74 is slidably disposed. A circular fluid seal 73 is disposed as shown within the aperture 72 and slidably engages the cylindrical surface of the rod member 74.

A piston member 76 is disposed within the housing portion 62 and is operatively joined at one side thereof to the piston rod member 74. Another piston rod member 78 is centrally secured to the other side of the piston 76 and it extends axially through a suitable aperture 80 formed in an end wall 82 of the housing portion 62 into the end of the housing portion 38. The extended portion of the piston rod member 78 is provided with rack teeth 84 which are operatively engaged with a pinion sector 86. The rockshaft 36 operatively carries the pinion sector 86 and is rotated thereby to produce an oscillatory motion of the pitman arm 34. A suitable drain fitting 87 is provided as shown for connecting the low pressure conduit 56 with the interior of the housing portion 38.

Referring next to the cross sectional view of Figure 3 taken through the end housing 38, the extended portion of the piston rod member 78 is shown slidably supported by a concave bushing 88 fixed to the base of the housing portion 38. The bushing 88 serves to provide a suitable support for the extended portion of the piston rod member 78 to resist transverse separating forces which are created between the rack teeth 84 and pinion 86.

As further seen in Figure 3, the rack teeth 84 may be formed with a tooth depth which varies transversely across the member 78, as shown. The teeth of the pinion 86 which operatively engage the rack teeth 84 may be laterally positioned by means of an adjusting member 90 which provides a lateral abutment portion for the transverse rocker shaft 36 upon which pinion 86 is secured. Adjusting member 90 comprises a screw portion which is threadably received within a threaded aperture 92 in the side of end housing 38 and is effective to laterally position the rocker shaft 36 by virtue of the abutting contact provided at 94. Suitable retainer means 96 may be employed for restraining relative movement between the rocker shaft 36 and the adjusting member 90 in a direction transverse to the axis of the piston rod portion 78.

Referring again to Figure 2, a hollow nut member 98 is axially disposed within the housing portion 60 and is operatively connected at one end thereof to the piston rod member 74 by means of a lost motion joint 100. The structural features of the lost motion joint 100 will subsequently be described in detail with reference to Figure 4.

The opposite end of the nut member 98 threadably receives an externally threaded shaft 102 which extends axially from one end of the housing portion 60 and which is rotatably journalled therein by suitable bearing means 104 and 106. A suitable end seal is provided at 108 about the shaft 102.

The threaded connection between the nut member 98 and the shaft 102 includes a plurality of steel balls 110 disposed within internal grooves in the nut member 98 and within mating external grooves in the shaft 102. A suitable splined connection may be provided between the shaft 102 and the manually actuated shaft 12, a portion of said splined connection being shown at 112.

A drain passage 114 is provided within the wall of the housing portion 60 and extends longitudinally from a drain port 116 adjacent the threaded end of the nut member 98 to an exit port 118 provided in the vicinity of the partition wall 70. A conventional drain plug 117 may be provided, as shown, for preventing leakage from the port 116. The exit port 118 may be connected to the drain conduit 54 by a suitable fitting, as shown in Figure 1. The drain passage 114 and the drain conduit 54 are provided for the purpose of accommodating the flow of fluid from the interior of housing portion 60 in the event that fluid leakage occurs through rod seal 73 from the housing portion 62 to the housing portion 60. The housing portion 60 is normally substantially filled with fluid and therefore fluid leakage at the rod seal 73 may in fact cause a discharge through the passage 114 and conduit 54.

Figure 4:
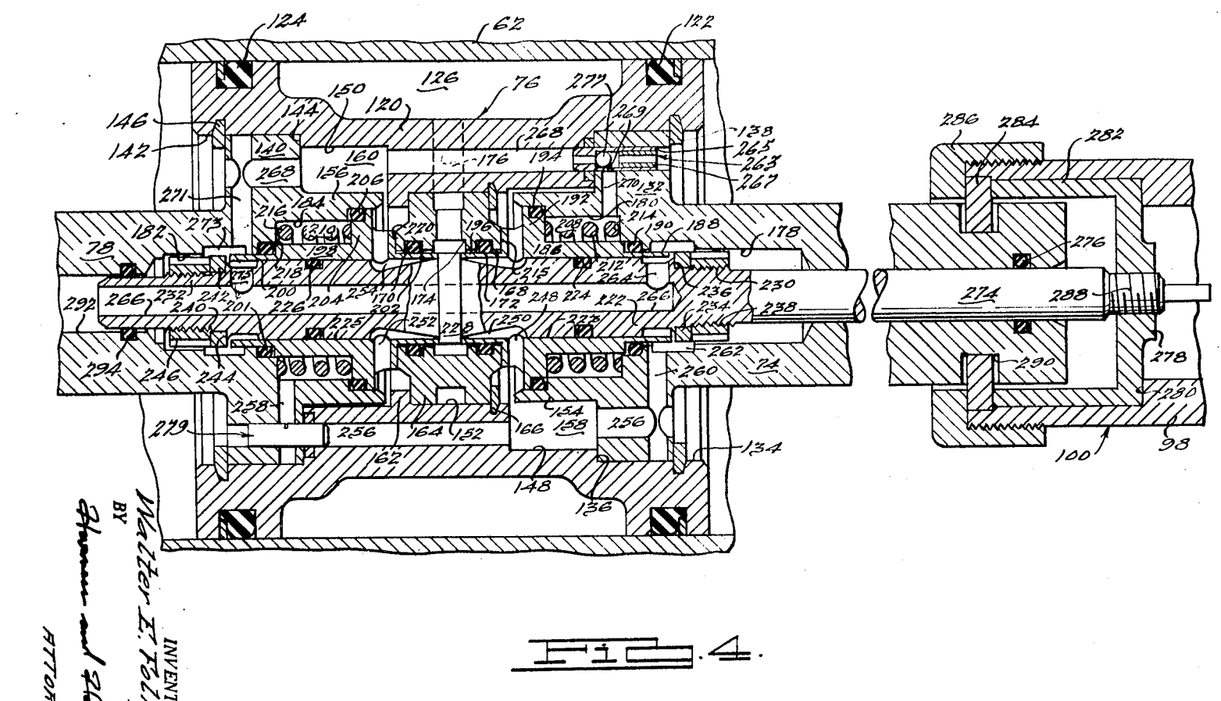
Figure 4 is an enlarged longitudinal sectional view of the piston of the power boosting mechanism showing the fluid pressure control valve concentrically and slidably disposed therein.

Referring next to Figure 4, the piston structure 76 and the lost motion structure 100 are shown in more particular detail. It is seen that the piston structure 76 comprises a generally cylindrical body portion 120 which is slidably disposed within the cylindrical chamber defined by housing portion 62. Suitable sealing rings 122 and 124 are provided at either axial end of the piston body 76 to provide a peripheral sealing contact between the same and the internal cylindrical wall of the housing portion 62. A central peripheral portion of the piston body 76 is recessed to provide an annular space 126 which is adapted to be in communication with a fluid pressure inlet port 128 during relative axial movement between piston 76 and housing portion 62, as seen in Figure 2, from one extreme axial position to the other. A suitable fluid pressure fitting 130 may be provided for the purpose of supplying the chamber 126 with fluid pressure from conduit 52.

The piston rod portion 74 is provided with a radially extending flange portion 132 which is adapted to be received within a circular end recess 134 in the piston body 76. Relative axial movement between the flange portion 132 and the piston body 76 is prevented by virtue of an abutting contact between the flange portion 132 and an annular shoulder 136 provided within the recess 134 and by virtue of a suitable snap ring 138 which is received within the inner wall of the recess 134.

The piston rod portion 78 is similarly provided with a radially extending end flange portion 140 disposed within an end recess 142 in the piston body 76. Relative axial movement between the flange portion 140 and the piston body 76 is prevented by virtue of an annular shoulder 144 and a snap ring 146 provided within the recess 142.

The central portion of the piston body 76 is provided with a central axially extending opening or aperture therethrough which comprises relatively large diameter portions 148 and 150, located adjacent the recesses 134 and 142 respectively, and comprising further a relatively small diameter portion 152 substantially intermediate either axial end of the piston body 76. A cylindrical, hollow piston rod extension 154 extends axially within the piston aperture portion 148 and is integrally formed on the radially extending flange portion 132. Similarly, a cylindrical extension 156 extends within the aperture portion 150 on the opposite side of housing body 76 and is integrally formed on the flange portion 140. The extensions 154 and 156 cooperate with the associated large diameter aperture portions 148 and 150 to define similarly disposed annular spaces 158 and 160, respectively.

Reduced diameter piston aperture portion 152 is provided with an internal annular shoulder 162 and receives therein a circular valve member 164 which is axially positioned against the shoulder 162. The portion aperture 152 may be adapted to internally receive a snap ring 166 for retaining the member 164 in a fixed axial position against the shoulder 162. The member 164 is provided with an axially extending central aperture 168, the walls of which may be provided with a pair of grooves 170 and 172 for receiving suitable O ring seals therein. A third groove 174 may be provided between the grooves 170 and 172 and is adapted to be in fluid communication with the annular space 126 through one or more radially extending passages 176 in the piston body 76.

The piston rod portion 74, the associated flange portion 132, and extension 154 are provided with a central axially extending aperture comprising a reduced diameter portion 178 and a relatively large diameter portion 180. Similarly, the piston rod portion 78, the associated flange portion 140, and the extension 156 are also provided with a central axially extending aperture consisting of a reduced diameter portion 182 and relatively large diameter portion 184.

A valve member 186 is slidably received within the aperture portion 180 and the aperture portion 178 and is provided with an end portion 188 which is adapted to be slidably received within the reduced diameter aperture portion 178. A suitable O ring 190 is received within an annular recess in the aperture portion 178 and is adapted to provide a sealing contact with the valve member end portion 188 as shown. Valve member 186 is also provided with a radially extending flange portion 192 which is adapted to slidably contact the internal surface of the aperture portion 180 within the piston rod extension 154. The internal surface of the aperture portion 180 and the outer peripheral surface of the flange portion 192 may be adapted to receive therebetween a suitable O ring seal 194.

Another end portion 196 is provided on the other end of the valve member 186 and is slidably received within the central aperture 168 in the valve member 164 and is sealingly and slidably engaged by the O ring seal 172.

Another valve member 198, which is substantially similar to the valve member 186, is slidably received within the aperture portions 182 and 184 in the piston rod portion 78 and in the associated extension 156, respectively. The valve member 198 is also provided with reduced diameter end portions 200 and 202 which are slidably received within the aperture portion 182 in the piston rod portion 78 and the central aperture 168 in the valve member 164, respectively. A suitable O ring seal 201 is adapted to provide a sealing engagement between the end portion 200 and the surrounding cylindrical wall of the aperture portion 182.

The valve member 198 is also provided with a radial flange portion 204 which is slidably received within the large diameter aperture portion 184. A peripheral edge of the flange portion 204 and the internal surface of the aperture portion 184 are adapted to receive therebetween an O ring seal 206 for providing a slidable sealing contact.

Annular chambers 208 and 210 are defined by large diameter aperture portions 180 and 184 and the associated valve members 186 and 198, respectively. A resilient compression spring 212 is disposed within the chamber 208 and is seated at one end thereof on a radially disposed shoulder 214 located at the point of discontinuity between the large diameter aperture portion 180 and the smaller diameter aperture portion 178. The other end of the spring 212 is seated on one side of the flange portion 192 and is effective to urge the same in an axial direction thereby maintaining the other side of the flange portion 192 in abutting contact with a shoulder 215 on one side of the valve member 164.

Similarly, a spring 216 is disposed within the annular space 210 and is seated upon a radially extending shoulder 218 located at the point of discontinuity between the larger diameter aperture portion 184 and the smaller diameter aperture portion 182. The other end of the spring 216 is seated upon one side of the flange portion 204 and is effective to urge the valve member 198 into abutting contact with a shoulder 220 located on the other side of valve member 164.

An axially shiftable valve element 222 is concentrically disposed within the hollow interiors 223 and 225 of the valve members 186 and 198, respectively, and is adapted for relative axial movement therein. Suitable O ring seals 224 and 226 may be provided, as shown, to produce a sealing engagement between the internal surfaces of the valve members 186 and 198 and the valve element 222. The valve element 222 is further provided with a radially extending shoulder 228 against which the end portions 196 and 202 of the valve members 186 and 198, respectively, are adapted to be normally engaged.

The axial ends of the valve element 222 are each provided with a threaded portion 230 and 232, respectively. A stop ring 234 is disposed about the threaded end portion 230 and is axially fixed against a radially extending shoulder 236 on one end of the valve element 222 by a spanner nut 238 which is threadably received upon the threaded portion 230.

Similarly, the other end of valve element 222 is also threaded as shown at 240 and it is adapted to receive another stop ring 242. The stop ring 242 is maintained in fixed axial position against the shoulder 244 on the other end of the valve element 222 by a second spanner nut 246 which is threadably received on the threaded end portion 240.

A plurality of radially extending fluid passageways 248 may be provided, as shown, for establishing a fluid connection between the annular chamber 158 and a recess 250 provided in the outer surface of the valve element 222. The recess 250 is provided with a progressively decreasing cross sectional area and extends to the proximate vicinity of the abutting engagement of the shoulder portion 228 and the end portion 196 of the valve member 186.

Similarly, a plurality of radially extending fluid passageways 252 are provided, as shown, for effecting a fluid communication between the annular space 160 and another recess 254 provided in the outer surface of the valve element 222. The recess 254 also defines a passageway of progressively decreasing cross sectional area extending from the passages 170 to the vicinity of the abutting engagement between the shoulder portion 228 and the end portion 202 of the valve member 198.

One or more axially extending flange passages 256 may be provided in the piston body 76 for effecting fluid communication between the annular chamber 158 and the right side of the piston structure, as viewed in Figure 4. Passage 256 also provides fluid communication between the annular chamber 158 and one or more radially extending passages 258 which extend to the annular space 210 on one side of the shoulder portion 204 of the valve member 198.

Other radially extending passages 260 are provided, as shown, for establishing fluid communication between the passages 256 and a recess 262 provided on the interior surface of the smaller diameter aperture portion 178. The recess 262 is in fluid communication through one or more radial passages 264 with a central axially extending opening 266 within the valve element 222. It is to be observed that all the fluid passing from the recess 262 into the radial passages 264 must pass between the spacing provided between the stop ring 234 and the free end of the end portion 188 of the valve member 186.

Similarly, other passages 268 extend axially through the piston member 76 thereby providing fluid communication between the left side of the piston structure, as shown in Figure 4, and the annular chamber 160. Passages 268 also are in fluid communication with one or more radially extending passages 270 which in turn extend to the annular chamber 208 on one side of the shoulder portion 192 of the valve member 186.

Radial passages 271 are provided for interconnecting the passage 268 with an annular recess 273 formed in the inner wall of the reduced diameter aperture portion 182. The recess 273 is in communication with the central opening 266 in the valve element 222 through one or more radial passages 275. It should also be noted that all of the fluid passing from the recess 273 must pass through the spacing provided between the stop ring 242 and the free end of the end portion 200 on the valve member 198.

A check valve insert 263 is provided, as shown in Figure 4, within at least one of the axial openings in the flange portion 132 and is adapted to form an extension of air passages 268. The insert 263 comprises an axially apertured cylindrical member 265, which is received within one end of passage 268, and a smaller cylindrical member 267, which is received within the member 265. A port or slot 269 is provided within the wall of each of the outer cylindrical members 265 form a fluid communication between the interior aperture of member 265 and the radial passage 270. A ball check valve element 277 is provided within the interior of the member 265 and is adapted to be moved axially and to be alternately seated on the apertured member 267 or the apertured member 265. The passage 270 will therefore alternately communicate through port 269 with the axial passage 268 or the working chamber to the right of piston 76, as viewed in Figure 4.

A similar check valve insert 279 is provided within at least one axial opening in the flange portion 140 to form a continuation or extension of an axial passage 256. The internal structure of the insert 279 is identical to that of insert 263 and it performs a similar function.

A valve actuator rod 274 may be integrally fixed to one end of valve element 222, as shown, and may extend concentrically through the piston rod portion 74 to the lost motion connection assembly 100. Another suitable O ring seal element 276 may be provided, as shown, to effect a slidable sealing engagement during relative axial movement between the valve actuator rod 274 and the piston rod portion 74.

As shown in Figure 4, the lost motion mechanism 100 comprises a member 278 which may be positioned against a radially extending shoulder 280 provided on the nut member 98, which was previously referred to above in connection with the description of Figure 2. The member 278 is provided with an axially extending circular spacer portion 282 against which a lost motion plate element 284 is axially positioned. An end closure nut member 286 is threadably received upon the end of the nut member 98 and is effective to maintain the assembly of member 278 and element 284 in fixed axial relationship with respect to the nut member 98.

The valve actuator rod 274 is threadably secured at 288 to the central portion of the lost motion member 278. The valve element 222, the valve actuator rod 274 and the nut portion 98, may therefore move axially as an integral assembly. The end of the piston rod portion 74 is provided with a circumferential groove 290 within which a lost motion element 284 is adapted to extend. The axial dimension of the groove 290 is greater than the corresponding axial dimension of the element 284 thereby providing a lost motion gap between the element 284 and either side of the circumferential groove 290.

Piston rod portion 78 is also provided with an axially extending central opening 292 within which the adjacent end portion 232 of the piston element 222 is adapted to extend. A suitable O ring seal 294 is adapted to provide a sealing engagement between the end portion 232 and the internal surface of the opening 292 in the piston rod portion 78.

The axial opening 292 and the piston rod portion 78 are in close communication with the interior of the housing portion 38 through a suitable fluid drain passage 296.

The operation of the structure above set forth is substantially as follows:

The shaft 102 is adapted to be connected with the manually actuated steering shaft 12 for rotary movement within the concentrically disposed bearings 104 and 106. This rotary movement causes an axial shifting movement of the nut member 98 by virtue of the threaded connection therewith provided by the steel balls 110 and the associated grooves in the shaft 102 and the nut member 98. The piston rod portion 74 is axially shifted by the nut member 98 with a followup motion by virtue of the lost motion connection 100 between the same. The axial force thus imparted to the piston rod portion 74 causes the piston 76 to reciprocate axially within the power cylinder defined by the housing portion 62. This reciprocating motion is accompanied by an axial sliding movement of the piston rod portion 78 and the associated rack teeth 84 over the concave bushing 88. The corresponding axial movement of the rack teeth 84 imparts a rotary movement to the pinion sector 86 which in turn produces rotary oscillatory movement of the rocker shaft 36 thereby effecting an oscillatory motion of the pitman arm 34. The pitman arm 34 is positively connected to the steering arms for the road wheels 20 and 22, as shown in Figure 1, through a positive steering linkage mechanism comprising link 32, bellcrank 30, link 26, and link 28.

The valve element 222 and the valve actuator shaft 274 are integrally connected to the nut member 98 by the lost motion member 278 whereas the piston body 76 and the piston rod portion 74 are connected to the nut member 98 through the lost motion element 284 which permits a limited amount of relative axial movement between the piston rod portion 74 and the nut member 98. Accordingly, a manual steering effort applied to the steering wheel 14 will be accompanied by a relative axial movement between the valve element 222 and the piston body 76.

As seen in Figure 1, the engine-powered pump 46 is effective to maintain a substantially constant working pressure in the accumulator 50 which in turn supplies the power steering unit 10 with working pressure through the high pressure conduit 52. The working pressure enters the annular chamber 126 through the fitting 130 and is conducted to the annular groove 174 of the valve member 164 through the passage 176.

Assuming that the valve element 222 is caused to shift to the left with respect to the piston body 76, as viewed in Figure 4, the shoulder portion 228 of the valve element 222 will become unseated from the end portion 196 thereby producing a gap therebetween which may accommodate the flow of high pressure fluid from groove 174 to the recess 250. This relative axial shifting movement between valve element 222 and the piston body 76 simultaneously causes the valve member 198 to be shifted to the left within the aperture portions 182 and 184 in the piston rod portion 78 and extension 156, respectively.

High pressure fluid is free to pass into the annular space 158 through the radial passageways 248 and then to the working chamber to the right of the piston body 76, as viewed in Figures 1 and 4, through the axially extending passages 256. Accordingly, a pressure buildup will occur in this working chamber which will be effective to supplement the manual steering effort being applied to the piston rod portion 78 and pinion sector 86 by causing an axial force on the piston assembly.

The pressure buildup within the power cylinder is accompanied by a corresponding pressure buildup within the annular space or reaction chamber 210 on the left side of the flange portion 204 of the valve member 198 by virtue of the fluid communication provided between the same and the pressurized working chamber by passages 256 and 258 and by the check valve insert 279. The hydraulic reaction thus produced on the valve member 198 tend to oppose the relative axial shifting movement of the valve element 222 with a force which is proportional to the magnitude of the pressure buildup. This hydraulic reaction is transmitted to the manually actuated steering shaft 12 it acts in opposition to the manual steering effort applied thereto. The manual portion of the total steering effort tends to close the lost motion gap provided between either lateral shoulder of the groove 290 and the piston rod portion 74 and the lost motion element 284. However, the hydraulic reaction on the valve member 198 tends to maintain this lost motion gap open and to center the valve element 222 with respect to the piston body 76. The operator of the vehicle, therefore, experiences a steering sensation or "road feel" which consists of a hydraulic reaction to his manual steering efforts, the intensity of which is proportional to the magnitude of the pressure buildup within the working cylinder of the power steering unit 10 which in turn is determined by the resistance encountered by the road wheels 20 and 22 to a directional variation during turning maneuvers of the vehicle.

It is apparent that the ball check valve element within the insert will be moved to the left thereby blocking the passage of high pressure fluid from passage 256 to the low pressure working chamber to the left of piston 76, as viewed in Figure 4.

During movement of the piston 76 to the left within the working cylinder, as viewed in Figures 2 and 4, under the combined manual and power assist components of the total steering effort, the fluid within the working chamber on the left side of the piston is exhausted through axially extending passages 268 and the radial passageways 271 into the recess 273. The exhaust fluid then passes through the space provided between the stop ring 242 and the lateral end of the end portion 200 of the valve member 198 into the central opening 266 within the valve element 222. The exhaust fluid then passes into the central opening 292 provided in the piston rod portion 78 which communicates with the interior of the housing portion 38 through the drain passage 296. Exhaust fluid is then permitted to return to the low pressure side of the pump 46 by virtue of the fluid path provided by conduit 56 and fitting 87.

During the above-described relative shifting movement of the valve element 222 to the left, as viewed in Figure 4, the valve member 186 remains seated upon the shoulder 215 of the valve member 164 thereby preventing any substantial axial movement of the same. Accordingly, the gap provided between the stop ring 234 and the lateral end of the end portion 188 of the valve member 186 becomes reduced in size. It will be observed that the magnitude of this reduction in the size of the gap between the valve end portion 188 and the ring 234 is substantially equal to the magnitude of the gap produced between shoulder portion 228 and the valve end portion 196. Accordingly, high pressure fluid within the working chamber to the right of the piston 76, which is free to enter the radial passages 260, will be restricted from passing through the restricted space into the fluid drain circuit. The magnitude of the restriction offered by this restricted gap will be proportional to the magnitude of the relative axial movement between valve element 222 and the piston body 76.

The control mechanism above described, is accordingly effective to relatively control the magnitude of the pressure buildup in one or the other of the working chambers of the fluid cylinder by controlling the degree of the restriction within the fluid pressure intake passages leading to one of the working chambers and to correspondingly control the degree of the restriction in the fluid drain passages extending from this same working chamber into the fluid exhaust circuit.

During the application of a manual steering effort to the steering shaft 12 in the opposite direction, the valve element 222 will be shifted to the right, as viewed in Figure 4, with respect to the piston body 76 thereby causing a pressure buildup in the working chamber on the left side of the piston. In this instance the axially extending passages 268 serve as high pressure fluid intake passages and the axially extending passages 256 and radial passages 260 serve to exhaust the fluid from the chamber to the right of the piston 76. The spacing provided between the stop ring 242 and the end portion 200 of the valve member 198 is reduced thereby restricting the flow of high pressure fluid from the radial passages 271 into the fluid exhaust circuit. Simultaneously, the valve shoulder portion 228 becomes unseated from the valve end portion 202 thereby permitting the flow of high pressure fluid from the radial passage 176 and groove 174 into the recess 254 which in turn communicates with the radial passages 252 and the annular space 160.

The pressure buildup on the left side of the piston assembly tends to motivate the same to the right, and the low pressure fluid within the right working chamber is exhausted through passages 256, passages 260, through the gap between ring 234 and valve end portion 188 and then through passages 264 to opening 266.

When the working chamber on the left side of piston 76 is thus pressurized, the annular space or reaction chamber 208 also becomes pressurized by virtue of the fluid path provided by passages 270, insert 263 and passages 268. The ball check valve element 277 is seated upon the inner insert member 267 in this instance thereby causing fluid communication between passages 270 and 268 through slot 269.

It is apparent that the springs 212 and 216 tend to maintain the valve elements 186 and 198, respectively, in a central or neutral position during the operation of the unit. However, upon relative movement between the valve element 222 and either of the valve members 186 or 198, high pressure fluid will be caused to act against the radial flange portions 192 or 204, respectively, in opposition to the force exerted by the associated springs 212 or 216. In order to prevent the valve members 186 or 198 from becoming unseated, both of the reaction chambers 208 and 210 are pressurized during turning maneuvers in either direction. The hydraulic force exerted upon the valve members 186 and 198 supplement the force exerted by springs 212 and 216, respectively. Thus, when the valve element 222 is moved to the right, as viewed in Figure 4, the valve member 198 will remain seated against shoulder 220 by virtue of the combined spring and hydraulic forces being exerted thereon on the left side of flange portion 204. The hydraulic force exerted on the right side of flange portion 204 is insufficient to overcome the combined opposing forces.

The inserts 263 and 279 with their associated side ports or slots provide a means for transferring fluid pressure from the pressurized passages 268 and 256, respectively, to the associated reaction chambers 208 and 210. As previously explained, the ball check valve element in each of the inserts 263 and 279 is adapted to be shifted axially and selectively seated on either of two valve seats.

By so pressurizing both reaction chambers, the valve members 186 and 198 remain seated in a neutral position at all times except when they are shifted axially by the annular shoulder portion 228 in valve element 222. The exhaust gaps between the stop rings 234 and valve end portion 188 and between stop ring 242 and valve end portion 200 will therefore be closed progressively depending upon the magnitude of the relative displacement between the valve element 222 and the valve body 76. On the other hand, if both reaction chambers were not pressurized, a substantially immediate or sudden increase in pressure in either working chamber would be experienced when a turning maneuver is initiated.

The recesses 250 and 252 provided on the valve element 222 are formed with a variable cross section, as shown in Figure 4, for the purpose of reducing the turbulence and accompanying noise during the transfer of high pressure fluid from the passage 176 to passage 248. The shape of the recesses is such that the 180° reversal in the flow direction may be smoothly accommodated.

A small clearance of approximately .001 inch may be provided between the shoulders 215 and 220 and the associated radial valve portions 192 and 204, respectively, to insure that the shoulder portion 228 will be in form contact with the valve end portions 196 and 202.

The clearance required between the rings 234 and 242 and the respective valve end portions 188 and 200 may readily be adjusted by means of a feeler gauge during the valve assembly operation. In the particular embodiment herein disclosed, a clearance of .004 to .006 inch was found to be satisfactory.

The butt-type valves provided within the high pressure fluid intake passages and the low pressure exhaust passages require no close manufacturing tolerances and they respond immediately to any relative movement between the cooperating portions of the valve to create a pressure differential thereacross.

It has been found to be desirable to make the valve members 186 and 198 from a relatively soft metal. The valve end portions 188 and 196 on valve member 186 and the valve end portions 200 and 202 on valve member 198 will therefore have a tendency to become firmly seated on the relatively hard shoulder portion 228 of valve element 222 and on the stop rings 234 and 242, respectively, through continued operation of the valve.

A fluid tight seal may also be obtained between the cooperating portions of the butt-type valve during the assembly operation by using a suitable grinding compound. The grinding compound may be applied to the contacting valve surfaces and the cooperating valve portions may then be relatively rotated to produce a sealing contact therebetween.

Another advantage of the valve structure of the present invention is that the valve element 222 is self-adjustable and self-centering. The springs 212 and 216 tend to bias the valve members 186 and 198 against the shoulders 215 and 220, respectively, on the valve member 164. This in turn causes the valve end portions 196 and 202 to sealingly contact the valve shoulder portion 228 without the need for any relative adjustment therebetween.

Another obvious advantage of the present valve design over the valve commonly used in the art resides in the relatively few component parts. Also, each of the parts may be readily machined with conventional production tooling equipment.

Although one preferred embodiment has been specifically disclosed, it is contemplated that modifications thereof may readily be made without departing from the scope of the appended claims.

I claim:

1. In combination with a power boosting mechanism, a power cylinder, a source of fluid pressure connected to one portion of said power cylinder, a low pressure fluid exhaust circuit, a fluid pressure actuated piston slidably disposed within said cylinder, and a pair of oppositely disposed working chambers defined by said pressure actuated member and said cylinder; a fluid control valve disposed within said piston and comprising a first valve element having axially spaced valve shoulder portions thereon, a second valve element concentrically and slidably disposed about said first valve element between two of said valve shoulder portions, said second valve element including valve end portions at either axial end thereof and positioned in proximate juxtaposed relationship with respect to said shoulder portions, spring means for biasing one of said end portions axially into engagement against one of said shoulder portions, a first passage means for conducting high pressure fluid from said cylinder portion to one of said working chambers, a second passage means for conducting fluid from said one working chamber to said exhaust circuit, said one end portion and said one shoulder portion being disposed within said first passage means and adapted to accommodate and to control the passage of fluid therethrough to said one working chamber, the other of said shoulder portions and the other of said end portions being disposed within said second passage means and adapted to accommodate and control the passage of fluid therethrough to said exhaust circuit.

2. In combination with a power boosting mechanism, a power cylinder, a source of fluid pressure connected to one portion of said power cylinder, a low pressure fluid exhaust circuit, a fluid pressure actuated piston slidably disposed within said cylinder, and a pair of oppositely disposed working chambers defined by said pressure actuated member and said cylinder; a fluid control valve disposed within said piston and comprising a first valve element having axially spaced valve shoulder portions thereon, a second valve element concentrically and slidably disposed about said first valve element between two of said valve shoulder portions, said second valve element including valve end portions at either axial end thereof and positioned in proximate juxtaposed relationship with respect to said shoulder portions, spring means for biasing one of said end portions axially into engagement against one of said shoulder portions, a first passage means for conducting high pressure fluid from said cylinder portion to one of said working chambers, a second passage means for conducting fluid from said one working chamber to said exhaust circuit, said one end portion and said one shoulder portion being disposed within said first passage means and adapted to accommodate and to control the passage of fluid therethrough to said one working chamber, the other of said shoulder portions and the other of said end portions being disposed within said second passage means and adapted to accommodate and control the passage of fluid therethrough to said exhaust circuit, said first valve element being relatively movable in an axial direction with respect to said second valve element to selectively seat and unseat the axially engageable one shoulder portion and said one end portion while simultaneously varying the axial spacing between the other of said shoulder portions and the other of said end portions.

3. In combination with a power boosting mechanism, a power cylinder, a source of fluid pressure connected to one portion of said power cylinder, a low pressure fluid exhaust circuit, a fluid pressure actuated piston slidably disposed within said cylinder, and a pair of oppositely disposed working chambers defined by said pressure actuated member and said cylinder; a fluid control valve disposed within said piston and comprising a first valve element having axially spaced valve shoulder portions thereon, a second valve element concentrically and slidably disposed about said first valve element between two of said valve shoulder portions, said second valve element including valve end portions at either axial end thereof and positioned in proximate juxtaposed relationship with respect to said shoulder portions, spring means for biasing one of said end portions axially into engagement against one of said shoulder portions, a first passage means for conducting high pressure fluid from said cylinder portion to one of said working chambers, a second passage means for conducting fluid from said one working chamber to said exhaust circuit, said one end portion and said one shoulder portion being disposed within said first passage means and adapted to accommodate and to control the passage of fluid therethrough to said one working chamber, the other of said shoulder portions and the other of said end portions being disposed within said second passage means and adapted to accommodate and control the passage of fluid therethrough to said exhaust circuit, said first valve element being relatively movable in an axial direction with respect to said second valve element to selectively seat and unseat the axially engageable one shoulder portion and said one end portion while simultaneously varying the axial spacing between the other of said shoulder portions and the other of said end portions, the relative axial movement between said first and said second valve element in one direction being effective to cause the associated respective shoulder and end portions to selectively restrict the fluid flow with a progressively increasing degree through said first passage means while simultaneously restricting the flow through said second passage means with a progressively decreasing degree.

4. In combination with a power boosting mechanism, a power cylinder, a source of fluid pressure connected to one portion of said power cylinder, a low pressure fluid exhaust circuit, a fluid pressure actuated piston slidably disposed within said cylinder, and a pair of oppositely disposed working chambers defined by said pressure actuated member and said cylinder; a fluid control valve disposed within said piston and comprising a first valve element having axially spaced valve shoulder portions thereon, a second valve element concentrically and slidably disposed about said first valve element between two of said valve shoulder portions, said second valve element including valve end portions positioned at either axial end thereof in proximate juxtaposed relationship with respect to said shoulder portions, spring means for biasing said second valve element and one of said associated end portions in one axial direction into engagement against one of said shoulder portions, a first passage means for conducting high pressure fluid from said cylinder portion to one of said working chambers, a second passage means for conducting fluid from said one working chamber to said exhaust circuit, a third passage means in communication with said first passage means and extending to one side of said second valve element, said one end portion and said one shoulder portion being disposed within said first passage means and adapted to accommodate and to control the passage of fluid therethrough to said one working chamber, the other of said shoulder portions and the other of said end portions being disposed within said second passage means and adapted to accommodate and control the passage of fluid therethrough to said exhaust circuit.

5. In combination with a power boosting mechanism, a power cylinder, a source of fluid pressure connected to one portion of said power cylinder, a low pressure fluid exhaust circuit, a fluid pressure actuated piston slidably disposed within said cylinder, and a pair of oppositely disposed working chambers defined by said cylinder and said piston; a control valve disposed within said piston and comprising a first valve element having axially spaced valve shoulder portions thereon, a second valve element telescopically associated with one portion of said first valve element, a third valve element telescopically associated with another portion of said first valve element, each of said second and third valve elements including valve end portions positioned at either axial end thereof in proximate juxtaposed relationship with respect to said shoulder portions, a first passage means for conducting high pressure fluid from said cylinder portion to either one of said working chambers, a second passage means for conducting fluid from either one of said working chambers to said exhaust circuit, at least one pair of juxtaposed valve end and shoulder portions being disposed in said first and in said second passage means, said valve end and shoulder portions being adapted to selectively control the passage of high pressure fluid into either of said working chambers while simultaneously controlling the flow of fluid from either of said working chambers to said exhaust circuit upon relative movement between said first valve element and one of said other valve elements.

6. In combination with a power boosting mechanism, a power cylinder, a source of fluid pressure connected to one portion of said power cylinder, a low pressure fluid exhaust circuit, a fluid pressure actuated piston slidably disposed within said cylinder, and a pair of oppositely disposed working chambers defined by said cylinder and said piston; a control valve disposed within said piston and comprising a first valve element having axially spaced valve shoulder portions thereon, a second valve element telescopically associated with one portion of said first valve element, a third valve element telescopically associated with another portion of said first valve element, each of said second and third valve elements including valve end portions positioned at either axial end thereof in proximate juxtaposed relationship with respect to said shoulder portions, a first passage means for conducting high pressure fluid from said cylinder portion to either one of said working chambers, a second passage means for conducting fluid from either one of said working chambers to said exhaust circuit, at least one pair of juxtaposed valve end and shoulder portions being disposed in said first and in said second passage means, said valve end and shoulder portions being adapted to selectively control the passage of high pressure fluid into either of said working chambers while simultaneously controlling the flow of fluid from either of said working chambers to said exhaust circuit upon relative movement between said first valve element and one of said other valve elements thereby causing a pressure buildup in either one or the other of said working cylinders, and auxiliary passage means for conducting high pressure fluid from either one or the other of said working chambers to one side of said second and said third valve elements, respectively, thereby causing a pressure reaction opposing said relative movement which is proportional in magnitude to said pressure buildup.

7. In combination with a power boosting mechanism, a power cylinder, a source of fluid pressure connected to one portion of said power cylinder, a low pressure fluid exhaust circuit, a fluid pressure actuated piston slidably disposed within said cylinder, a pair of oppositely disposed working chambers defined by said pressure actuated member and said cylinders, a driven member positively connected to said piston member, a driving member, and a lost motion connection between said piston and said driving member; a control valve disposed within said piston and comprising a first valve element having axially spaced valve shoulder portions thereon, said first valve element being positively connected to said driving member, a second valve element slidably disposed within said piston and telescopically associated with one portion of said first valve element, a third valve element slidably disposed within said piston and telescopically associated with another portion of said first valve element, each of said second and third valve elements including valve end portions positioned at either axial end thereof in proximate juxtaposed relationship with respect to said shoulder portions, a first passage means for conducting high pressure fluid from said cylinder portion to either one of said working chambers, a second passage means for conducting fluid from either one of said working chambers to said exhaust circuit, at least one pair of juxtaposed valve end and shoulder portions being disposed in said first and in said second passage means, said valve end and shoulder portions being adapted to selectively control the passage of high pressure fluid into either of said working chambers while simultaneously controlling the flow of fluid from either of said working chambers to said exhaust circuit upon relative movement between said first element and one of said other valve elements during actuation of said driving member.

8. In combination with a power steering mechanism comprising a power cylinder, a piston disposed within said cylinder for axial movement therein, a driven member positively connected to said piston, a driving member, a lost motion connection between said driving member and said piston, a first and a second hollow valve sleeve element slidably received within said piston in juxtaposed concentric relationship, said first and second valve elements each having a valve end portion formed at either end thereof, a third valve element slidably disposed within said first and second valve elements, and axially spaced valve shoulder portions formed on said third valve element, each of said valve shoulder portions being disposed in proximate adjacent relationship with at least one of said valve end portions and adapted to be axially shifted into lateral abutting contact therewith upon actuation of said driving member, pressure passage means for supplying said power cylinder with working fluid pressure and exhaust passage means for exhausting fluid pressure from said power cylinder, said pressure passage means and said exhaust passage means each including separate portions extending to each of said working chambers, certain ones of said adjacent valve chambers and valve end portions forming a part of said pressure passage portions and certain others of said adjacent valve shoulder and valve end portions forming a part of said exhaust passage portion, said valve elements and said valve shoulders forming a variable restriction for producing a pressure buildup in either one of said working chambers and for exhausting the other of said working chambers.

9. In a power boosting mechanism including a power cylinder, a movable hollow piston slidably disposed in said cylinder, means for supplying said power cylinder with fluid under pressure, a valve means having portions disposed within said piston member, said valve means comprising a hollow valve sleeve element slidably received within said piston member, valve end portions on said hollow valve sleeve element, another valve element slidably disposed within said hollow valve element, a shoulder portion on said other valve element, said shoulder and end portions being adapted for relative movement into and out of abutting engagement thereby defining an annular valve opening therebetween of variable size, passage means in said piston extending from said means for supplying fluid pressure through said piston to one side thereof, said annular opening forming a portion of said passage means and providing a variable restriction to the flow of fluid therethrough, a pressure reaction chamber formed on one side of said hollow valve element, and auxiliary passage means extending from said one side of said piston to said reaction chamber, said hollow valve sleeve element thereby being biased into abutting engagement with said shoulder portion to resist relative movement of said other valve element relative to said piston member.

10. In a power boosting mechanism including a power cylinder, a movable hollow piston slidably disposed in said cylinder, means for supplying said power cylinder with fluid under pressure, a valve means having portions disposed within said piston member, said valve means comprising a pair of hollow juxtaposed valve elements concentrically and slidably received within said piston member, valve end portions on each of said pair, another valve element slidably disposed within said hollow valve element for relative movement in opposed directions, a plurality of shoulder portions on said other valve element, one of said shoulder portions being disposed adjacent each of said valve end portions respectively, said adjacent shoulder and end portions being adapted for relative movement into and out of abutting engagement thereby defining annular valve openings therebetween of variable size, passage means in said piston extending from said means for supplying fluid pressure through said piston to either side thereof, certain of said annular openings forming a portion of said passage means and providing a variable restriction to the flow of fluid therethrough to either side of said piston as determined by the direction of said relative movement between said other and said hollow valve elements.

11. In a power boosting mechanism including a power cylinder, a movable hollow piston slidably disposed in said cylinder, means for supplying said power cylinder with fluid under pressure, a valve means having portions disposed within said piston member, said valve means comprising a pair of hollow juxtaposed valve elements concentrically and slidably received within said piston member, valve end portions on each of said pair, another valve element slidably disposed within said hollow valve element for relative movement in opposed directions, a plurality of shoulder portions on said other valve element, one of said shoulder portions being disposed adjacent each of said valve end portions respectively, said adjacent shoulder and end portions being adapted for relative movement into and out of abutting engagement thereby defining annular valve openings therebetween of variable size, passage means in said piston extending from said means for supplying fluid pressure through said piston to either side thereof, certain of said annular openings forming a portion of said passage means and providing a variable restriction to the flow of fluid therethrough to either side of said piston as determined by the direction of said relative movement between said other and said hollow valve elements, said hollow valve elements including pressure reaction portions thereon, and means for subjecting said reaction portions to fluid pressure from either side of said piston thereby producing a reaction force which opposes said relative movement.

12. In a power boosting mechanism including a power cylinder, a movable hollow piston slidably disposed in said cylinder, means for supplying said power cylinder with fluid under pressure, a valve means having portions disposed within said piston member, said valve means comprising a pair of hollow juxtaposed valve elements concentrically and slidably received within said piston member, valve end portions on each of said pairs, another valve element disposed within said hollow valve element for relative movement in opposed directions, a plurality of shoulder portions on said other valve element, one of said shoulder portions being disposed adjacent each of said valve end portions respectively, said adjacent shoulder and end portions being adapted for relative movement into and out of abutting engagement thereby defining annular valve openings therebetween of variable size, passage means in said piston extending from said means for supplying fluid pressure through said piston to either side thereof, an exhaust circuit means for exhausting fluid from either side of said piston, certain of said annular openings forming a portion of said passage means and providing a variable restriction to the flow of fluid therethrough to either side of said piston, and certain other annular openings forming a portion of said exhaust circuit means and adapted to control the flow of fluid from either side of said piston, said certain valve openings and said certain other valve openings being adapted to operate in sequence thereby causing a pressure buildup at either side of said piston as determined by the direction of said relative movement.

13. In a power boosting mechanism including a power cylinder, a movable hollow piston slidably disposed in said cylinder, means for supplying said power cylinder with fluid under pressure, a valve means having portions disposed within said piston member, said valve means comprising a pair of hollow juxtaposed valve elements concentrically and slidably received within said piston member, valve end portions on each of said pairs, another valve element disposed within said hollow valve element for relative movement in opposed directions, a plurality of shoulder portions on said other valve element, one of said shoulder portions being disposed adjacent each of said valve end portions respectively, said adjacent shoulder and end portions being adapted for relative movement into and out of abutting engagement thereby defining annular valve openings therebetween of variable size, passage means in said piston extending from said means for supplying fluid pressure through said piston to either side thereof, an exhaust circuit means for exhausting fluid from either side of said piston, certain of said annular openings forming a portion of said passage means and providing a variable restriction to the flow of fluid therethrough to either side of said piston, and certain other annular openings forming a portion of said exhaust circuit means and adapted to control the flow of fluid from either side of said piston, said certain valve openings and said certain other valve openings being adapted to operate in sequence thereby causing a pressure buildup at either side of said piston as determined by the direction of said relative movement, said hollow valve elements including pressure reaction portions thereon, and means for subjecting said reaction portions to fluid pressure from either side of said piston thereby causing a reaction force which opposes said relative movement.

14. The combination as set forth in claim 12 wherein said other valve element is provided with a central axially extending passage, said axially extending passage forming a portion of said exhaust circuit means.

15. The combination as set forth in claim 13 wherein said other valve element is provided with a central axially extending passage, said axially extending passage forming a portion of said exhaust circuit means.

16. In a power boosting mechanism, a power cylinder, a fluid pressure movable piston member slidably disposed within said cylinder, two spaced working chambers defined by said piston member and by said cylinder, pressure passage means for supplying fluid pressure to each of said working chambers, exhaust passage means for exhausting fluid pressure from each of said working chambers, a control valve means for selectively controlling the distribution of fluid pressure to either side of said piston member while simultaneously exhausting fluid pressure from the other side of said piston member, a personally operable member, a lost motion connection between said piston member and said personally operable member, said valve means including a movable valve member disposed within said piston member and secured to said personally operable member, axially spaced valve shoulders formed on said movable valve member, a first valve sleeve member positioned about said movable valve member between two adjacent valve shoulders, a second valve sleeve member positioned about said movable valve member between two other adjacent valve shoulders, each of said valve sleeves having valve end surfaces adapted to cooperate with a separate juxtaposed valve shoulder to form a circular valve opening therebetween, the valve opening associated with one side of each of said valve sleeves forming a portion of said pressure passage means and the valve opening associated with the other side of each of said valve sleeves forming a portion of said exhaust passage means.

17. In a power boosting mechanism, a power cylinder, a fluid pressure movable piston member slidably disposed within said cylinder, two spaced working chambers defined by said piston member and by said cylinder, pressure passage means for supplying fluid pressure to each of said working chambers, exhaust passage means for exhausting fluid pressure from each of said working chambers, said pressure passage means and said exhaust passage means each having one portion thereof formed in said piston member extending to one of said working chambers and having another portion thereof formed in said piston member extending to the other of said working chambers, a control valve means for selectively controlling the distribution of fluid pressure to either side of said piston member while simultaneously controlling the exhausting of fluid pressure from the other side of said piston member, a personally operable member, a lost motion connection between said piston member and said personally operable member, said valve means including a movable valve member disposed within said piston member and secured to said personally operable member, axially spaced valve shoulders formed on said movable valve member, a first valve sleeve member positioned about said movable valve member between two adjacent valve shoulders, a second valve sleeve member positioned about said movable valve member between two other adjacent valve shoulders, each of said valve sleeves having valve end portions adapted to abut a separate juxtaposed valve shoulder and to form a circular valve opening therebetween upon movement of said movable valve member, the valve openings associated with one end of said first and of said second valve sleeves defining in part said one and said other pressure passage portions respectively, the valve opening associated with the other end of said first and of said second valve sleeves defining in part said one and said other exhaust passage portions respectively, said valve sleeve end portions and said valve shoulders being adapted to distribute fluid pressure to one of said working chambers and to exhaust fluid pressure from the other of said working chambers upon movement of said personally operable member in one direction and to distribute fluid pressure to said other working chambers and to exhaust fluid pressure from said one working chamber upon movement of said personally operable member in the opposite direction.

18. In a power boosting mechanism, a power cylinder, a fluid pressure movable piston member slidably disposed within said cylinder, two spaced working chambers defined by said piston member and by said cylinder, pressure passage means for supplying fluid pressure to each of said working chambers, exhaust passage means for exhausting fluid pressure from each of said working chambers, said pressure passage means having one portion formed in said piston member extending to one of said working chambers and having another portion formed in said piston member extending to said other working chamber, a control valve means for selectively controlling the distribution of fluid pressure to either side of said piston member while simultaneously controlling the exhausting of fluid pressure from the other side of said piston member, a personally controlled movable member, a lost motion connection between said piston member and said movable member, said valve means including a movable valve member disposed within said piston member and secured to said movable member, axially spaced valve shoulders formed on said movable valve member, a first valve sleeve member positioned about said movable valve member between two adjacent valve shoulders, a second valve sleeve member positioned about said movable valve member between two other adjacent valve shoulders, an internal shoulder formed in said piston member for limiting axial movement of each of said valve sleeve members toward a central position, each of said valve sleeve members having valve end portions adapted to abut a separate and adjacent one of said valve shoulders upon axial movement of the latter with respect to said piston member, one valve end surface of each of said valve sleeve members being relatively proximate said central portion, said movable valve member being adapted to shift one of said valve sleeve members away from said internal piston shoulder and to form a valve opening between said one valve end portion of the other valve sleeve member and the valve shoulder of said movable valve member adjacent thereto upon movement of said movable valve member in one axial direction, said movable valve member being adapted to shift another of said valve sleeve members away from said internal piston shoulder and to form a valve opening between said one valve end surface of said one valve sleeve member and the shoulder of said movable valve member adjacent thereto upon movement of said movable valve member in the other axial direction, a fluid pressure reaction chamber formed behind each of said valve sleeve members, and separate auxiliary passage means communicating with each of said reaction chambers for conducting working fluid pressure from said working chambers to bias said valve sleeve members toward said central position and to oppose relative movement between said movable valve member and said piston member.

19. The combination as set forth in claim 18 wherein said control valve means further includes a spring element disposed in each of said pressure reaction chambers for biasing said valve sleeve members toward said central position to supplement the biasing force produced within said fluid pressure reaction chambers.

20. In a power boosting mechanism, a power cylinder, a fluid pressure movable piston member slidably disposed within said cylinder to define a pair of spaced working chambers, pressure passage means for supplying fluid to each of said working chambers, exhaust passage means for exhausting fluid pressure from each of said working chambers, said pressure passage means and said exhaust passage means each having one portion thereof communicating with one of said working chambers and having another portion thereof communicating with the other of said working chambers, a control valve means for selectively controlling the distribution of fluid pressure to one of said working chambers while simultaneously controlling the exhausting of fluid from the other of said working chambers, an actuating member, a lost motion connection between said actuating member and said piston member, said valve means including a movable valve member disposed within said piston member and secured to said actuating member, axially spaced valve shoulders formed on said movable valve member, a first valve sleeve member positioned about said movable valve member between two adjacent valve shoulders, a second valve sleeve member positioned about said movable valve member between two other adjacent valve shoulders, an internal shoulder formed in said piston member for limiting axial movement of each of said valve sleeve members toward a central position, the axial ends of each of said valve sleeve members forming valve end surfaces, each of said valve end surfaces being adapted to abut a separate one of said valve shoulders upon axial movement of said movable valve member with respect to said piston member, one valve end surface of each of said valve sleeve members being relatively proximate to said central position, said movable valve member being adaptable to shift one of said valve sleeve members away from said internal piston shoulder to form a valve opening between said one valve end surface of the other valve sleeve member and the valve shoulder of said movable valve member adjacent thereto upon movement of said movable valve member in one axial direction, said movable valve member being adapted to shift the other of said valve sleeve members away from said internal piston shoulder and to form a valve opening between said one valve end surface of said one valve sleeve member and the shoulder of said movable valve member adjacent thereto upon movement of said movable member in the other axial direction, the other valve end surface of each of said valve sleeve members being disposed in juxtaposed relationship with respect to separate other valve shoulder members of said movable valve member to form other valve openings therebetween, the other valve opening associated with said other valve sleeve member being reduced in size upon movement of said movable valve member in said one axial direction and the other valve opening associated with said one valve sleeve member being reduced in size upon movement of said movable valve member in said other axial direction, the valve openings associated with said one valve end surface partly defining said portions of said one pressure passage means and said other valve openings partly defining said portions of said exhaust passage means.

21. In a power boosting mechanism, a power cylinder, a fluid pressure movable piston member slidably disposed within said cylinder to define a pair of spaced working chambers, a driving member, a driven member connected to said piston member, a lost motion connection between said driving member and said piston member, a control valve means disposed within said piston member comprising an axially movable valve element, three axially spaced valve shoulders formed on said movable valve element, a first valve sleeve surrounding said movable valve member between an outer shoulder and the intermediate shoulder, a second valve sleeve surrounding said movable valve member between the other outer and the intermediate shoulder, one of the axial ends of each of said valve sleeves forming a first valve portion adapted to abut said intermediate shoulder, the other axial end of each of said valve sleeves forming second valve portions adapted to abut a separate one of said outer shoulders, pressure passage means in said piston for supplying fluid pressure to said power cylinder including portions communicating with each of said working chambers, exhaust passage means for exhausting fluid pressure from said power cylinder including portions communicating with each of said working chambers, said first valve portion of said valve sleeves and said intermediate shoulders being disposed in said pressure passage portions to regulate the distribution of fluid pressure to said working chambers, said second valve portions and said outer valve shoulders being disposed in said exhaust passage portions to regulate the discharge of fluid from said working cylinders.

22. The combination as set forth in claim 21 wherein said first and said second valve portions are adapted to be moved relative to said piston member by said movable valve member upon axial movement of said driving member, and wherein said control valve means includes a pressure reaction chamber adjacent each of said valve sleeve members, and auxiliary passage means for conducting working fluid pressure to each of said reaction chambers to resist relative movement between said driving member and said piston member.

References Cited in the file of this patent
UNITED STATES PATENTS

| | | |
|---|---|---|
| 1,848,923 | Almen | Mar. 8, 1932 |
| 1,934,691 | Baker | Nov. 14, 1933 |
| 2,260,491 | Stelzer | Oct. 28, 1941 |
| 2,432,721 | Brown | Dec. 16, 1947 |
| 2,451,334 | Groves | Oct. 12, 1948 |